US012781641B2

(12) United States Patent
Kusumoto

(10) Patent No.: US 12,781,641 B2
(45) Date of Patent: Nov. 3, 2026

(54) HYDROGEN AIRCRAFT

(71) Applicant: KAWASAKI JUKOGYO KABUSHIKI KAISHA, Kobe (JP)

(72) Inventor: Yoshiaki Kusumoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 19/472,877

(22) PCT Filed: Mar. 28, 2024

(86) PCT No.: PCT/JP2024/012583
§ 371 (c)(1),
(2) Date: Oct. 6, 2025

(87) PCT Pub. No.: WO2024/210031
PCT Pub. Date: Oct. 10, 2024

(65) Prior Publication Data

US 2026/0275883 A1 Sep. 17, 2026

(30) Foreign Application Priority Data

Apr. 7, 2023 (JP) ................................ 2023-063027

(51) Int. Cl.
*F02C 3/22* (2006.01)
*F01D 25/08* (2006.01)
*F02C 7/224* (2006.01)

(52) U.S. Cl.
CPC ................ *F01D 25/08* (2013.01); *F02C 3/22* (2013.01); *F02C 7/224* (2013.01); *F05D 2220/323* (2013.01); *F05D 2240/15* (2013.01); *F05D 2260/213* (2013.01)

(58) Field of Classification Search
CPC .. F01D 25/08; F02C 3/22; F02C 7/224; F05D 2220/323; F05D 2240/15; F05D 2260/213
See application file for complete search history.

(56) References Cited

U.S. PATENT DOCUMENTS

2017/0298822 A1* 10/2017 Garde La Casa ......... F01D 5/02
2022/0145801 A1* 5/2022 McCurdy Gibson ..... F02C 3/22

FOREIGN PATENT DOCUMENTS

CN 109630268 A * 4/2019 ............. B64D 27/10
JP 2014134150 A * 7/2014
JP 2016502622 A * 1/2016 ................ F02C 3/22
JP 2021142954 A * 9/2021

* cited by examiner

*Primary Examiner* — Eldon T Brockman
(74) *Attorney, Agent, or Firm* — Sughrue Mion, PLLC

(57) ABSTRACT

A hydrogen aircraft including a gas turbine engine including a combustion gas space where a combustion gas flows and a non-combustion gas space radially adjacent to the combustion gas space; a fuel tank storing hydrogen fuel in a liquid phase; a fuel supply passage connecting the fuel tank to the gas turbine engine; a heat exchanger in the fuel supply passage and located in the combustion gas space; a heat shield movable between a first position and a second position, the first position being where the heat shield projects from the non-combustion gas space to the combustion gas space to cover at least a part of an upstream side of the heat exchanger, the second position where the heat shield is retracted from the combustion gas space to the non-combustion gas space; and an actuator moving the heat shield between the first position and the second position.

7 Claims, 6 Drawing Sheets

HYDROGEN AIRCRAFT

CROSS REFERENCE TO RELATED APPLICATIONS

This is a National Stage Application of International Application No. PCT/JP2024/012583 filed Mar. 28, 2024, claiming priority based on Japanese Patent Application No. 2023-063027 filed Apr. 7, 2023.

TECHNICAL FIELD

The present disclosure relates to a hydrogen aircraft including an engine that combusts hydrogen fuel.

BACKGROUND ART

PTL 1 discloses a hydrogen fuel supply system for an aircraft. In this system, liquid hydrogen supplied from a fuel tank to an engine is heated by a heat exchanger. The heat exchanger utilizes a heat source of the engine as a medium and performs heat exchange with the liquid hydrogen.

CITATION LIST

Patent Literature

PTL 1: U.S. Patent Application Publication No. 2022/0145801

SUMMARY OF INVENTION

Technical Problem

However, the temperature of the heat source of the engine may change in accordance with an operating state of the engine. A flow velocity of the liquid hydrogen flowing through the heat exchanger may also change in accordance with the operating state of the engine. Since the amount of heat input to the liquid hydrogen per unit density in the heat exchanger may change, the phase change of the hydrogen fuel in the heat exchanger is unstable.

An object of one aspect of the present disclosure is to stabilize the phase change of hydrogen fuel in a fuel supply passage of a hydrogen aircraft.

Solution to Problem

A hydrogen aircraft according to one aspect of the present disclosure includes: a gas turbine engine including a combustion gas space through which a combustion gas flows and a non-combustion gas space adjacent to the combustion gas space in a radial direction of the combustion gas space; a fuel tank storing hydrogen fuel in a liquid phase; a fuel supply passage connecting the fuel tank to the gas turbine engine; at least one heat exchanger interposed in the fuel supply passage and located in the combustion gas space; at least one heat shield that is movable between a first position and a second position, the first position being a position at which the at least one heat shield projects from the non-combustion gas space to the combustion gas space so as to cover at least a part of an upstream side of the heat exchanger, the second position being a position at which the at least one heat shield is retracted from the combustion gas space to the non-combustion gas space compared to the first position; and an actuator that moves the heat shield between the first position and the second position.

Advantageous Effects of Invention

According to one aspect of the present disclosure, the actuator is controlled in accordance with the operating state of the gas turbine engine so as to change an area where the heat shield covers the upstream side of the heat exchanger in the combustion gas space. Thus, the change in the amount of heat input to the hydrogen fuel per unit density in the heat exchanger can be reduced. Then, the phase change of the hydrogen fuel in the fuel supply passage of the hydrogen aircraft can be stabilized.

DESCRIPTION OF EMBODIMENTS

Hereinafter, an embodiment will be described with reference to the drawings.

Figure 1:
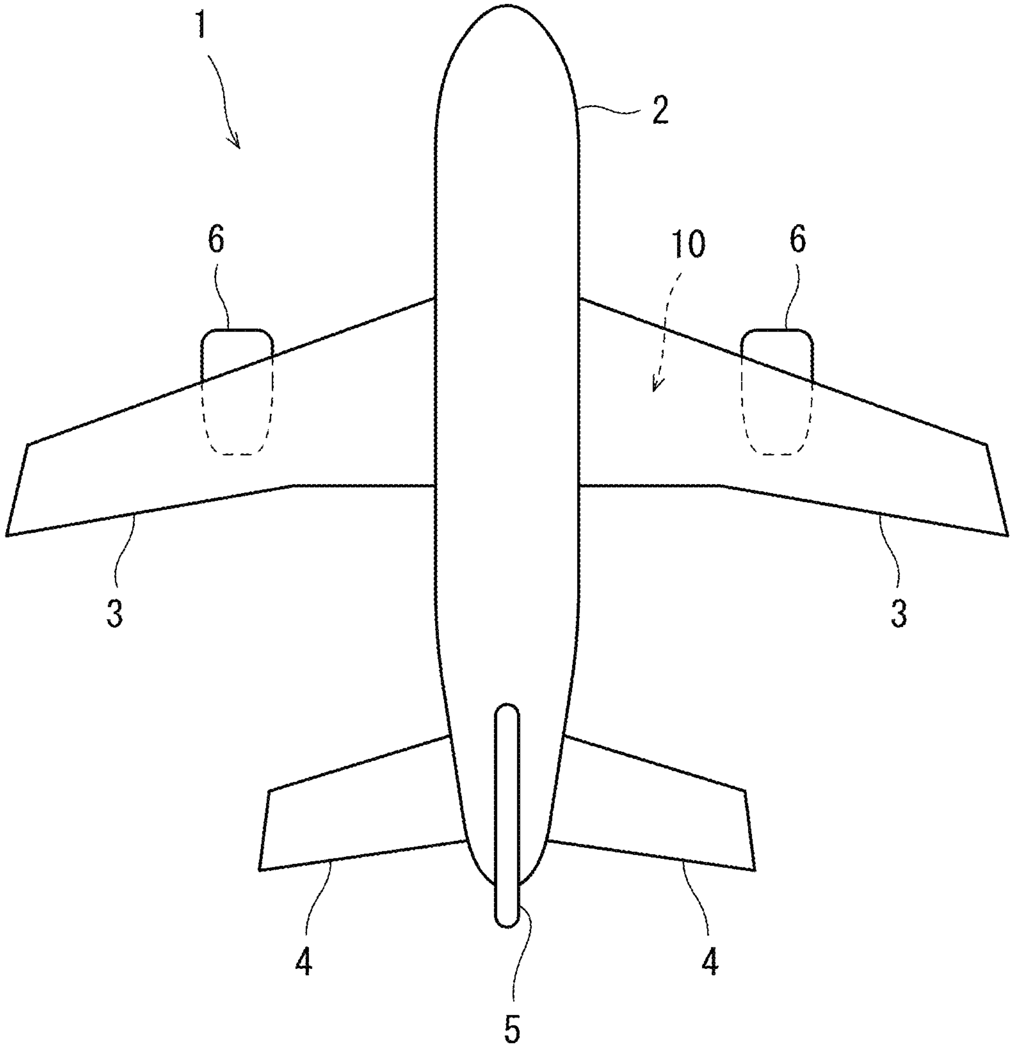
FIG. 1 is a plan view of a hydrogen aircraft according to an embodiment.

FIG. 1 is a plan view of a hydrogen aircraft 1 according to the embodiment. As shown in FIG. 1, the hydrogen aircraft 1 includes, for example, a fuselage 2, main wings 3, horizontal stabilizers 4, a vertical stabilizer 5, gas turbine engines 6, and auxiliary power equipment 7. The fuselage 2 extends in a front-rear direction of the hydrogen aircraft 1 and defines an occupant space therein. The main wings 3 are connected to an intermediate portion of the fuselage 2 in a front-rear direction and project from the fuselage 2 in a left-right direction of the aircraft 1. The horizontal stabilizers 4 project from a rear portion of the fuselage 2 in the left-right direction of the aircraft 1. The vertical stabilizer 5 projects upward from the rear portion of the fuselage 2. The gas turbine engines 6 are mounted on a pair of main wings 3. A hydrogen fuel supply system 10 is mounted on the main wings 3 and the gas turbine engines 6.

Figure 2:
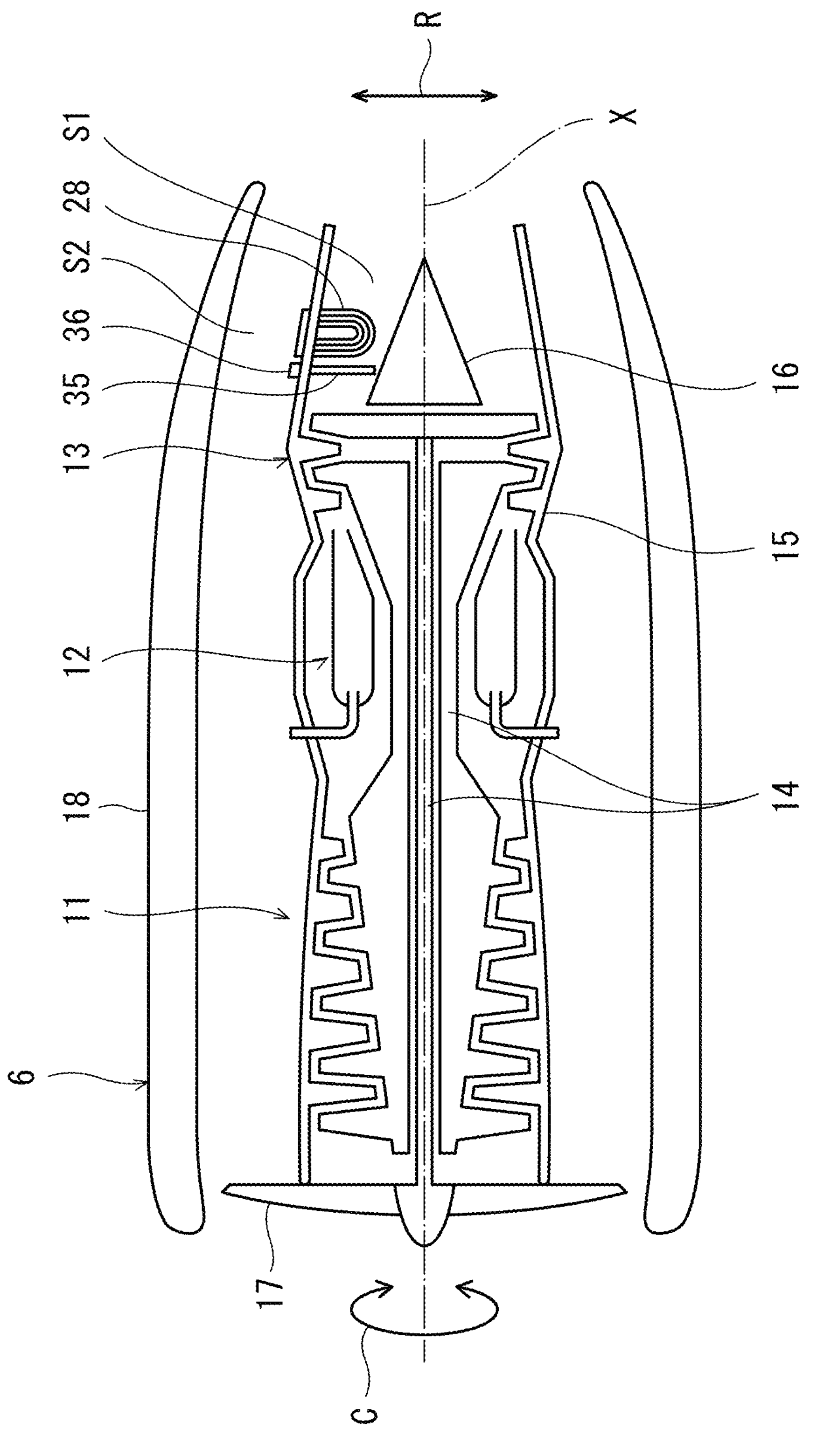
FIG. 2 is a sectional view of a gas turbine engine of the hydrogen aircraft of FIG. 1.

FIG. 2 is a sectional view of the gas turbine engine 6 of the hydrogen aircraft 1 of FIG. 1. As shown in FIG. 2, the gas turbine engine 6 includes a compressor 11, a combustor 12, a turbine 13, a rotating shaft 14, a casing 15, a tail cone 16, a fan 17, and a nacelle 18. In the gas turbine engine 6, air introduced into the casing 15 from the outside is compressed by the compressor 11, and the compressed air compressed by the compressor 11 is guided to the combustor 12. Hydrogen fuel is combusted in the combustor 12 together with the compressed air, and energy of the obtained high-temperature high-pressure combustion gas is taken out as rotational power in the turbine 13.

The turbine 13 is coupled to the compressor 11 through the rotating shaft 14. A direction in which an axis X of the rotating shaft 14 extends may be referred to as an axial direction X of the gas turbine engine 6. A direction orthogonal to the axis X may be referred to as a radial direction R. A direction extending around the axis X may be referred to as a circumferential direction C. The tail cone 16 is located downstream of the turbine 13 in the casing 15. The tail cone 16 defines, from a radially inner side, a combustion gas passage S1 through which the combustion gas delivered rearward from the turbine 13 flows.

The fan 17 is connected to a front end portion of the rotating shaft 14. The rotational power generated by the turbine 13 drives the compressor 11 and the fan 17. The nacelle 18 is located outside the casing 15 in the radial direction. A space between the casing 15 and the nacelle 18 serves as a bypass passage S2 through which the air delivered rearward by the fan 17 flows.

The combustion gas passage S1 is an example of a combustion gas space, and the bypass passage S2 is an example of a non-combustion gas space. The bypass passage S2 is adjacent to the combustion gas passage S1 in a radial direction of the combustion gas passage S1. The radial direction of the combustion gas passage S1 is the same as the radial direction R of the gas turbine engine 6.

A heat exchanger 28 is located in the combustion gas passage S1. A heat shield 35 is located upstream of the heat exchanger 28 in the combustion gas passage S1. The heat exchanger 28 and a sensor 29 are supported by, for example, the casing 15.

Figure 3:
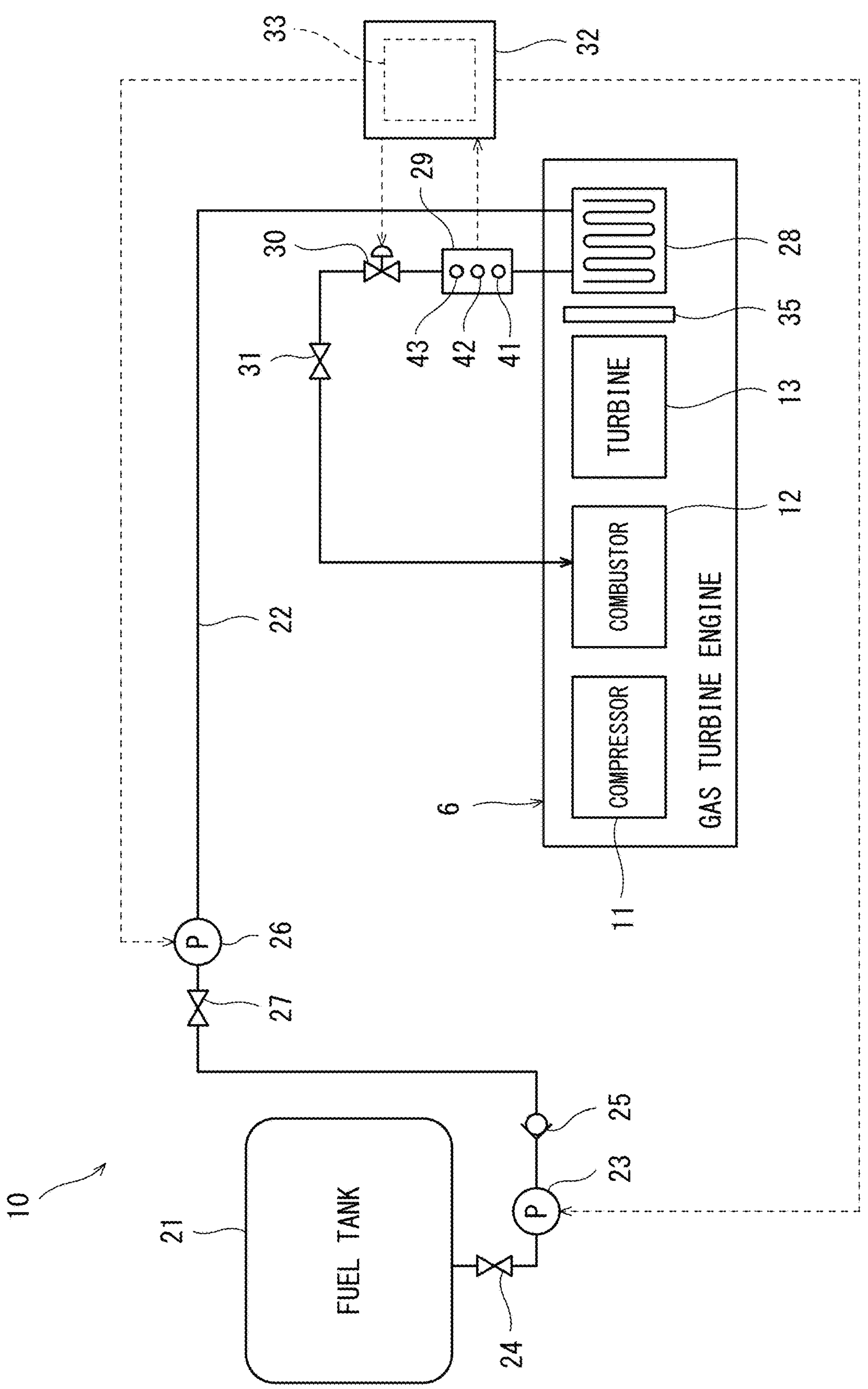
FIG. 3 is a block diagram of a hydrogen fuel supply system of FIG. 1.

FIG. 3 is a block diagram of the hydrogen fuel supply system 10 of FIG. 1. As shown in FIG. 3, the hydrogen fuel supply system 10 includes a fuel tank 21. The fuel tank 21 stores the hydrogen fuel in a liquid phase. The fuel tank 21 is mounted on the fuselage 2, the main wing 3, or both of these. The fuel tank 21 is connected to the gas turbine engine 6 by a fuel supply passage 22. When the fuel tank 21 is located in the fuselage 2, the fuel supply passage 22 extends from the fuselage 2 through the main wing 3 to the gas turbine engine 6 and is connected to the combustor 12. When the fuel tank 21 is located in the main wing 3, the fuel supply passage 22 extends from the main wing 3 to the gas turbine engine 6 and is connected to the combustor 12.

A feed pump 23 is located in the fuel supply passage 22. The feed pump 23 supplies the hydrogen fuel from the fuel tank 21 to the fuel supply passage 22. A shutoff valve 24 is located between the fuel tank 21 and the feed pump 23 in the fuel supply passage 22. A check valve 25 is located downstream of the feed pump 23 in the fuel supply passage 22.

A pressure pump 26 is located downstream of the check valve 25 in the fuel supply passage 22. The pressure pump 26 pressurizes the hydrogen fuel in the fuel supply passage 22. For example, the pressure pump 26 pressurizes the liquid-phase hydrogen fuel supplied from the fuel tank 21 such that the pressure of the hydrogen is higher than predetermined pressure when the hydrogen fuel flowing through the fuel supply passage 22 has reached a below-described main control valve 30. A shutoff valve 27 is located between the check valve 25 and the pressure pump 26 in the fuel supply passage 22.

The heat exchanger 28 is located downstream of the pressure pump 26 in the fuel supply passage 22. The heat exchanger 28 heats the hydrogen fuel flowing through the fuel supply passage 22. The heat exchanger 28 is thermally connected to the gas turbine engine 6. To be specific, the heat exchanger 28 heats the hydrogen fuel in the fuel supply passage 22 by utilizing the heat of the gas turbine engine 6.

The sensor 29 is located downstream of the heat exchanger 28 in the fuel supply passage 22. It is desirable that the sensor 29 be located downstream of the heat exchanger 28 and adjacent to the heat exchanger 28. In the present description, the term "adjacent" denotes that no other fluid devices, such as a valve and a pump, are located between two devices. The sensor 29 includes a flow meter 41, a pressure gauge 42, and a thermometer 43. To be specific, the sensor 29 measures the flow rate, pressure, and temperature of the hydrogen fuel which has flowed through the heat exchanger 28.

The control valve 30 is located downstream of the sensor 29 in the fuel supply passage 22. Moreover, it is desirable that the control valve 30 be located downstream of the sensor 29 and adjacent to the sensor 29. The control valve 30 adjusts the flow rate of the hydrogen fuel which has flowed through the heat exchanger 28 and the sensor 29. To be specific, the sensor 29 is located between the control valve 30 and the heat exchanger 28 in the fuel supply passage 22. It is desirable that the heat exchanger 28 and the sensor 29 be adjacent to each other in the fuel supply passage 22, and the sensor 29 and the control valve 30 be adjacent to each other in the fuel supply passage 22. A shutoff valve 31 is located downstream of the control valve 30 in the fuel supply passage 22. The presence and arrangement of the shutoff valves 24, 27, and 31 are optional.

The hydrogen fuel supply system 10 includes a controller 32. The controller 32 includes processing circuitry 33. The processing circuitry 33 includes a processor, a system memory, and a storage memory. The processor is, for example, a CPU. The system memory is, for example, a RAM. The storage memory is a hard disk, a flash memory, or a combination thereof. A configuration in which the processor executes the program stored in the storage memory and read out into the system memory is one example of the processing circuitry 33. The processing circuitry 33 is configured to control the feed pump 23, the pressure pump 26, the control valve 30, and a below-described actuator 36 in accordance with a detection signal of the sensor 29.

The processing circuitry 33 drives the feed pump 23 upon receiving an engine start command. The processing circuitry 33 controls the pressure pump 26 to pressurize the hydrogen fuel in the fuel supply passage 22 such that the pressure of the hydrogen fuel becomes higher than predetermined pressure. The processing circuitry 33 controls the control valve 30 such that the flow rate detected by the sensor 29 becomes a target flow rate. When the pressure detected by the sensor 29 is lower than the predetermined pressure, or when the temperature detected by the sensor 29 is lower than a predetermined temperature, the processing circuitry 33 outputs an alert. When the pressure detected by the sensor 29 is lower than the predetermined pressure, the processing circuitry 33 may control the pressure pump 26 such that the pressure detected by the sensor 29 exceeds the predetermined pressure. Moreover, when the temperature detected by the sensor 29 is lower than the predetermined temperature, the processing circuitry 36 may control the amount of heat input to the liquid hydrogen per unit density in the heat exchanger 28 such that the temperature detected by the sensor 29 exceeds the predetermined temperature. For example, when the heat exchanger 28 utilizes a heat source of the engine 6 as a medium, as in the present embodiment, the heat shield 35 is located upstream of the heat exchanger 28, and the actuator 36 is controlled to change an area where the heat shield 35 covers the heat exchanger 28.

Figure 4:
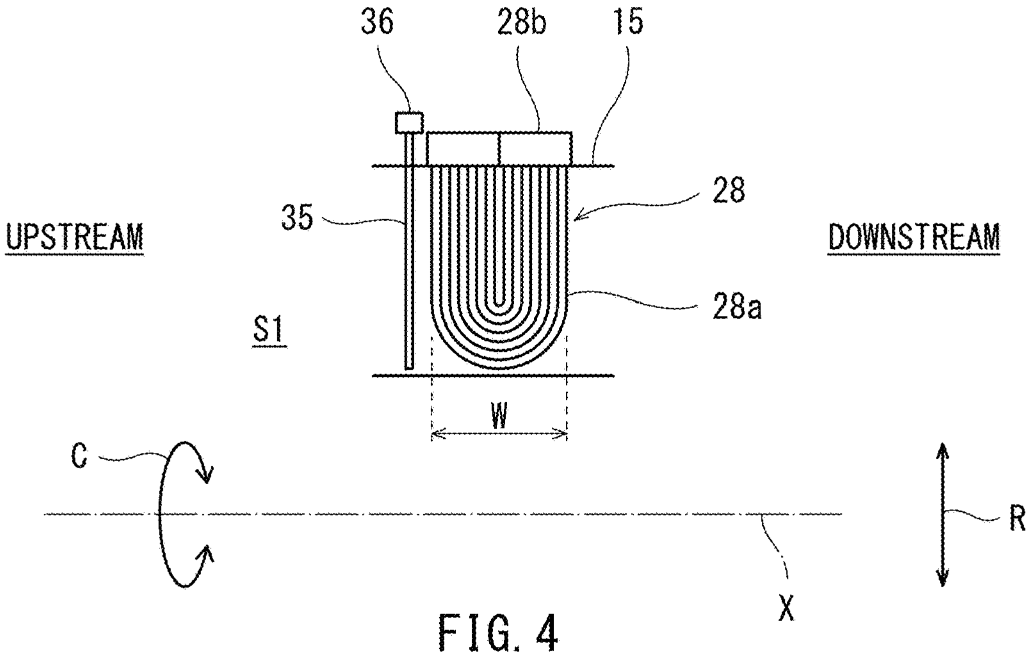
FIG. 4 is an enlarged view showing a heat exchanger and a heat shield of FIG. 2.
Figure 5:
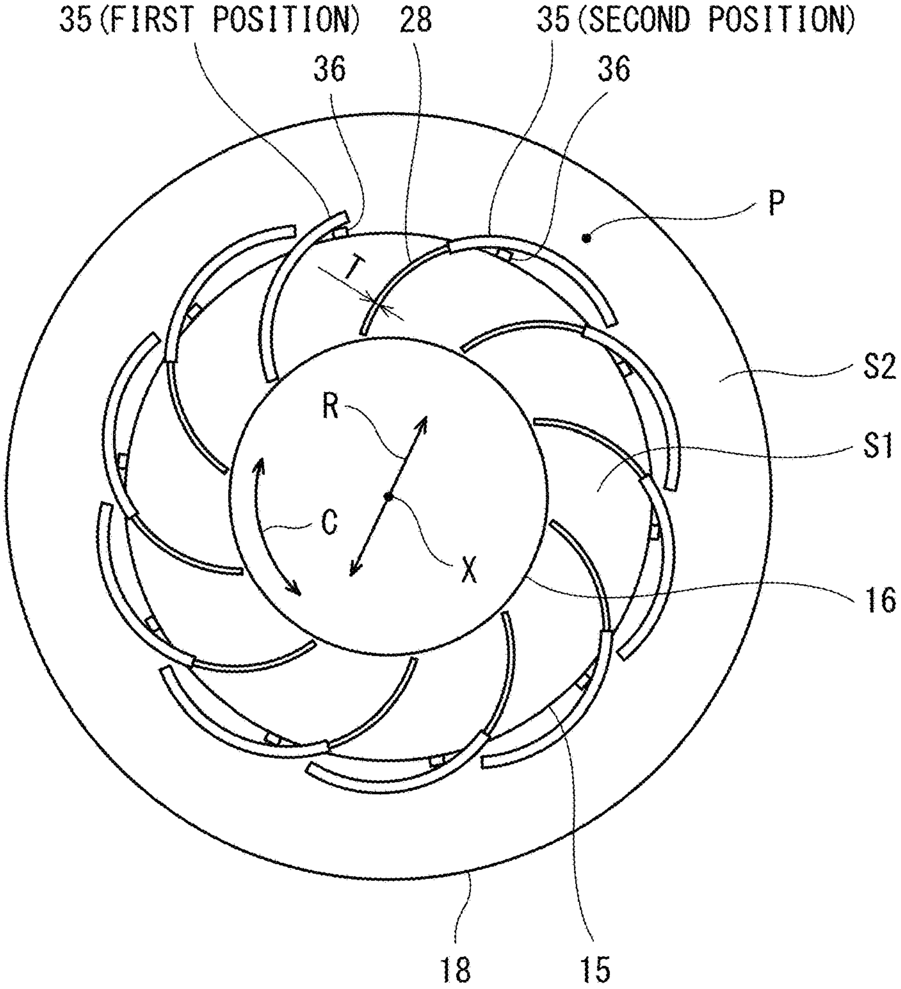
FIG. 5 is a diagram showing the heat exchangers and the heat shields of FIG. 2 as viewed from an upstream side in an axial direction of the gas turbine engine.

FIG. 4 is an enlarged view showing the heat exchanger 28 and the heat shield 35 of FIG. 2. FIG. 5 is a diagram showing the heat exchangers 28 and the heat shields 35 of FIG. 2 as viewed from an upstream side in the axial direction X of the gas turbine engine 6. As shown in FIG. 4, the heat exchanger 28 includes a heat exchange portion 28*a* and a base portion 28*b*. The heat exchange portion 28*a* is located in the combustion gas passage S1. The heat exchange portion 28*a* includes curved pipes through which the hydrogen fuel flows. When the pipes are subjected to the combustion gas flowing through the combustion gas passage S1, the hydrogen fuel in the pipes is heated. The shape of the heat exchange portion 28*a* may be appropriately selected in accordance with the combustion gas passage S1 and peripheral equipment. The base portion 28*b* is connected to an end portion of the heat exchange portion 28*a* in the radial direction R and fixed to the casing 15. Specifically, the base portion 28*b* supports upstream end portions and downstream end portions of the pipes of the heat exchange portion 28*a*.

As shown in FIG. 5, in the present embodiment, the number of heat exchangers 28 is plural. The heat exchangers 28 may be connected to each other in series or in parallel. The hydrogen fuel supplied from the pressure pump 26 (see FIG. 3) through the fuel supply passage 22 flows through the heat exchangers 28 and then reaches the sensor 29. To be specific, although FIG. 3 representatively shows only one heat exchanger 28, actually, there are the heat exchangers 28. However, the number of heat exchangers 28 in the hydrogen fuel supply system 10 may be one.

As shown in FIGS. 4 and 5, the heat exchanger 28 is located such that a width direction of the heat exchanger 28 extends along a flow direction of the combustion gas passage S1. For example, the heat exchanger 28 is located such that a surface of the heat exchanger 28 which has the smallest projected area faces the flow direction. The pipes of the heat exchange portion 28*a* are lined up along the flow direction of the combustion gas passage S1. The flow direction of the combustion gas passage S1 coincides with the axial direction X of the gas turbine engine 6. A thickness T of the heat exchange portion 28*a* in the circumferential direction C as viewed in the axial direction X is smaller than a width W of the heat exchange portion 28*a* in the axial direction X. Thus, since the area of the heat exchanger 28 is small when viewed from the upstream side of the combustion gas passage S1, the flow resistance of the combustion gas in the combustion gas passage S1 is reduced.

The heat exchangers 28 are located in the combustion gas passage S1 so as to be lined up in the circumferential direction C of the gas turbine engine 6. The heat shields 35 are located so as to correspond to the respective heat exchangers 28. The heat shield 35 may or may not contact the heat exchanger 28. The heat shield 35 is movable between a first position and a second position by being driven by the actuator 36. The heat shield 35 at the first position projects from the bypass passage S2 to the combustion gas passage S1 so as to cover all or part of the upstream side of the corresponding heat exchanger 28. To be specific, the heat shield 35 at the first position covers at least a part of an upstream end portion of the corresponding the heat exchanger 28 when viewed from the upstream side in the flow direction of the combustion gas passage S1. The heat shield 35 at the second position is retracted from the combustion gas passage S1 to the bypass passage S2 compared to the first position. An area where the heat shield 35 at the second position covers the corresponding heat exchanger 28 may be smaller than that at the first position. The heat shield 35 at the second position may not cover the heat exchanger 28. When the heat shield 35 is located at the second position in a movable range of the heat shield 35, the amount of projection of the heat shield 35 to the combustion gas passage S1 may be the smallest. The first position may be called an extended position or a cover position, and the second position may be called a retracted position or a non-cover position.

When viewed in the flow direction of the combustion gas passage S1, the heat exchanger 28 and the heat shield 35 are inclined relative to the radial direction R. The heat exchangers 28 and the heat shields 35 are inclined in the same direction relative to the radial direction R. Thus, when the heat shield 35 is located at the second position, the amount of projection of the heat shield 35 in the radial direction R in the bypass passage S2 is reduced. Among sets each including the heat exchanger 28 and the heat shield 35, at least two sets may be inclined in directions different from each other.

Figure 6:
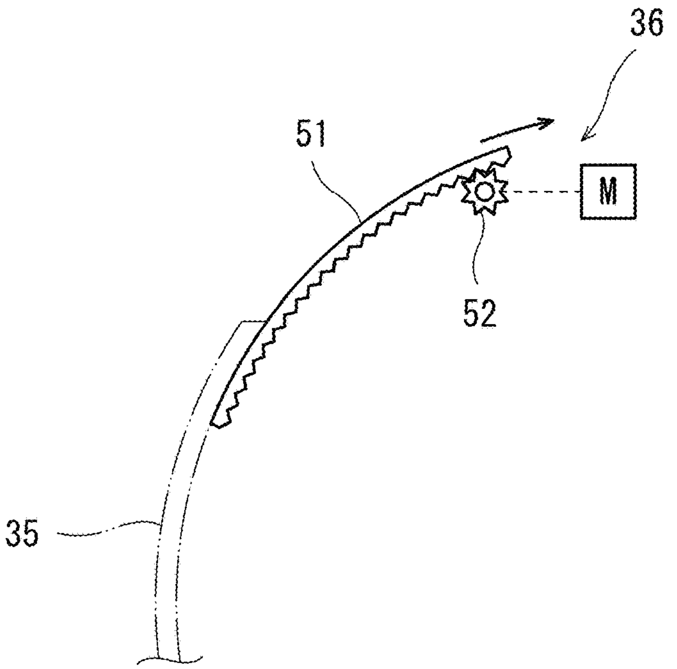
FIG. 6 is a schematic diagram of an actuator that moves the heat shield of FIG. 5.

When viewed in the flow direction of the combustion gas passage S1, each of the heat exchangers 28 and the heat shields 35 extends in the radial direction R and has a circular-arc shape. Thus, when the heat shield 35 is located at the second position, the amount of projection of the heat shield 35 in the radial direction R in the bypass passage S2 is reduced. When the heat shield 35 is located at the second position, an outermost position of the heat shield 35 in the radial direction R is located inside a center P in the radial direction R, the center P being located between an inner end and an outer end of the bypass passage S2 in the radial direction R. FIG. 6 is a schematic diagram of the actuator 36 that moves the heat shield 35 of FIG. 5. As shown in FIG. 6, the actuator 36 moves the heat shield 35 between the first position (see FIG. 5) and the second position (see FIG. 5). The type of the actuator 36 is not especially limited, and various types can be utilized. For example, the actuator 36 includes a rack-and-pinion structure driven by an electric motor M. Specifically, the actuator 36 includes: a rack 51 to which the heat shield 35 is fixed; a pinion 52 meshing with the rack 51; and the electric motor M that rotates the pinion 52. The rack 51 has, for example, a circular-arc shape and has a curvature that is the same as the curvature of the heat shield 35. Thus, when the electric motor M rotates the pinion 52, the rack 51 moves, and the heat shield 35 moves in a circular arc along an extended line of the heat shield 35.

As shown in FIGS. 3 to 5, the processing circuitry 33 is configured to control the actuator 36 in accordance with a parameter that increases as the output of the gas turbine engine 6 increases. To be specific, the parameter is correlated to the temperature of the combustion gas flowing through the combustion gas passage S1. For example, the parameter may be selected from an engine output command value, an engine rotational speed, the flow rate of the hydrogen fuel, and an engine temperature.

When the parameter changes so as to decrease by a predetermined amount, the processing circuitry 33 controls the actuator 36 such that the heat shield 35 moves in a direction from the first position toward the second position. When the parameter changes so as to increase by a predetermined amount, the processing circuitry 33 controls the actuator 36 such that the heat shield 35 moves in a direction from the second position toward the first position. Specifically, the processing circuitry 33 controls the actuator 36 to move the heat shield 35 based on a control map that defines a correspondence relation between the parameter and the position of the heat shield 35. The control map defines the correspondence relation between the parameter and the position of the heat shield 35 such that: when the parameter decreases, the heat shield 35 moves from the first position to the second position; and when the parameter increases, the heat shield 35 moves from the second position to the first position.

According to this, when the amount of heat input to the hydrogen fuel per unit density in the heat exchanger 28 increases (for example, when the gas turbine engine 6 operates at high output), the heat transferred from the combustion gas in the combustion gas passage S1 to the heat exchanger 28 is reduced by the heat shield 35. On the other hand, when the amount of heat input to the hydrogen fuel per unit density in the heat exchanger 28 decreases (for example, when the gas turbine engine 6 operates at low output), the extent to which the heat shield 35 blocks the heat transfer from the combustion gas in the combustion gas passage S1 to the heat exchanger 28 is reduced. Therefore, the change in the amount of heat input to the hydrogen fuel per unit density in the heat exchanger 28 can be reduced in accordance with the operating state of the gas turbine engine 6.

The processing circuitry 33 may use a predetermined formula instead of the control map and control the actuator 36 such that the heat shield 35 moves from the first position to the second position in proportion to the increase in the parameter. In other words, the processing circuitry 33 may use the formula and control the actuator 36 such that the heat shield 35 moves from the second position to the first position in proportion to the decrease in the parameter. Moreover, when the parameter is a threshold or less, the processing circuitry 33 may control the actuator 36 such that the heat shield 35 is retracted from the first position to the second position. In other words, when the parameter exceeds the threshold, the processing circuitry 33 may control the actuator 36 such that the heat shield 35 is extended from the second position to the first position.

According to the above configuration, the actuator 36 is controlled in accordance with the operating state of the gas turbine engine 6 to change the area where the heat shield 35 covers at least a part of the upstream side of the heat exchanger 28 in the combustion gas space. Therefore, the change in the amount of heat input to the hydrogen fuel per unit density in the heat exchanger 28 can be reduced. Then, the phase change of the hydrogen fuel in the fuel supply passage 22 of the hydrogen aircraft 1 can be stabilized.

Modified Example 1

Figure 7:
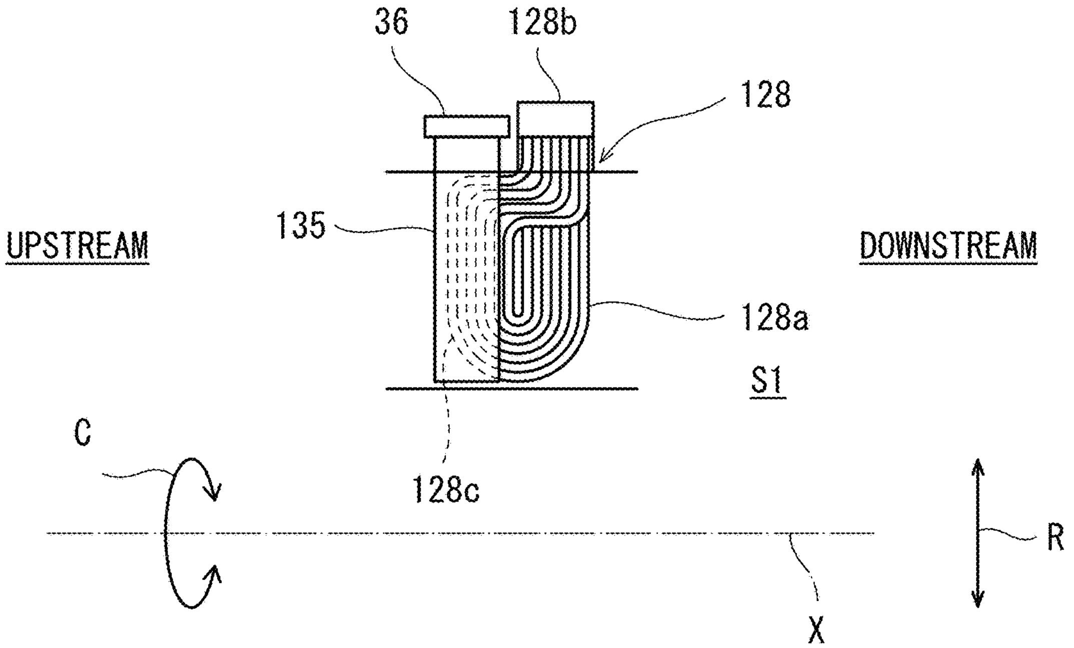
FIG. 7 is a diagram showing Modified Example 1 of the heat exchanger and the heat shield.

FIG. 7 is a diagram showing Modified Example 1 of a heat exchanger 128 and a heat shield 135. As shown in FIG. 7, the heat exchanger 128 of Modified Example 1 includes a heat exchange portion **128*a* and a base portion 128*b* to which the heat exchange portion 128*a* is connected. Specifically, the heat exchange portion 128*a* includes a projecting portion 128*c* that projects to the upstream side of the combustion gas passage S1 beyond the base portion 128*b*. Upstream end portions and downstream end portions of pipes of the heat exchange portion 128*a* are connected to the base portion 128*b* and overlap each other when viewed in the circumferential direction C. The upstream end portions and downstream end portions of the pipes of the heat exchange portion 128*a* may partially overlap each other when viewed in the circumferential direction C. The base portion 128*b* is located downstream of the projecting portion 128*c* of the heat exchange portion 128*a*** in the axial direction X.

When the heat shield 135 is located at the first position, the heat shield 135 covers all or part of a portion of the projecting portion **128*c* which faces the upstream side in the flow direction of the combustion gas space S1 and also covers all or part of a portion of the projecting portion 128*c* which faces a direction orthogonal to the flow direction of the combustion gas space S1. Specifically, the heat shield 135 covers all or part of the upstream end portion of the projecting portion 128*c* and also covers all or part of a portion of the projecting portion 128*c* which faces the circumferential direction C. When viewed in the radial direction R, the heat shield 135 has, for example, a V shape or a U shape. To be specific, when viewed in the radial direction R, the heat shield 135 has a recessed shape that surrounds the projecting portion 128*c*. Thus, when the heat shield 135 is located at the first position, the heat shield 135 adequately covers the heat exchange portion 128. Moreover, when the heat shield 135 moves from the first position to the second position, the heat shield 135 is prevented from interfering with the base portion 128*b***.

Modified Example 2

Figure 8:
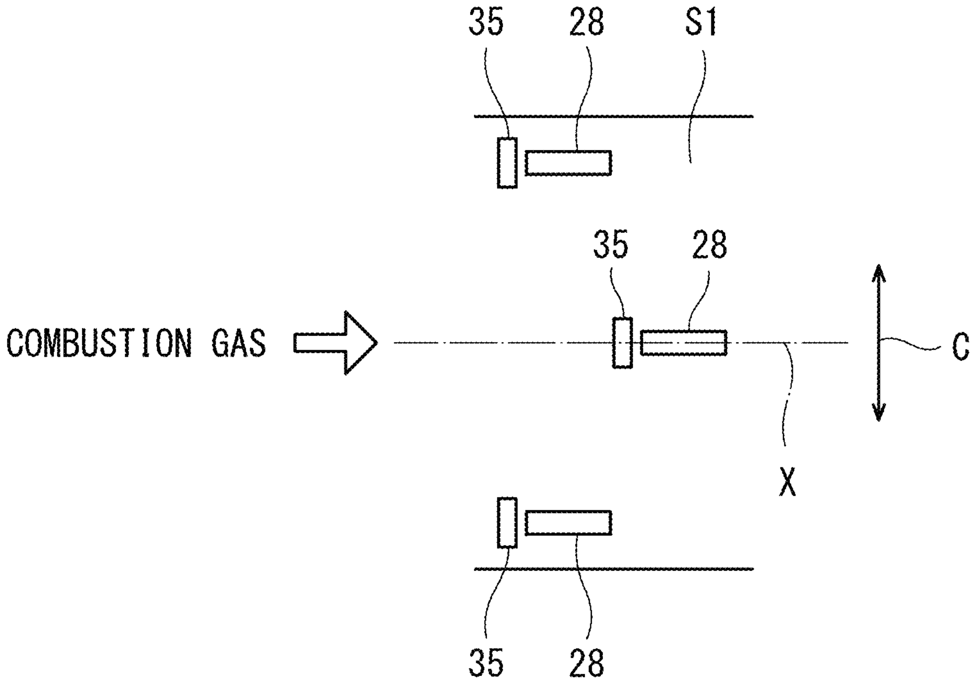
FIG. 8 is a diagram showing Modified Example 2 of the heat exchanger and the heat shield.

FIG. 8 is a diagram showing Modified Example 2 of the heat exchanger 28 and the heat shield 35. As shown in FIG. 8, in Modified Example 2, one of a pair of heat exchangers 28 adjacent to each other among the heat exchangers 28 is located upstream or downstream of the other in the axial direction X. For example, the heat exchangers 28 may be lined up in a zigzag in such a manner that the pair of heat exchangers 28 located at different positions in the axial direction X are located adjacent to each other in the circumferential direction C. According to this, even when the heat shields 35 are densely lined up in the circumferential direction C of the gas turbine engine 6, the mutual interference between the heat shields 35 during the movement is prevented.

The present disclosure is not limited to the above embodiment. Although the bypass passage S2 located outside the casing 15 in the radial direction R is described as the non-combustion gas space, the non-combustion gas space may be an internal space of the tail cone 16. For example, when the heat shield 35 is small, and/or the number of heat shields 35 is small, the heat shield 35 moving from the first position to the second position may be retracted in the internal space of the tail cone 16. According to this, the heat shields 35 can be located in accordance with the shape and size of the non-combustion gas space. The non-combustion gas space may include both of the bypass passage S2 and the internal space of the tail cone 16.

The foregoing has described the embodiment as an example of the technology disclosed in the present application. However, the technology in the present disclosure is not limited to this and is applicable to embodiments in which modifications, replacements, additions, omissions, and the like have been suitably made. Moreover, a new embodiment may be prepared by combining the components described in the above embodiments. For example, some of components or methods in one embodiment may be applied to another embodiment. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

The functionality of the elements disclosed herein may be implemented using circuitry or processing circuitry which includes general purpose processors, special purpose processors, integrated circuits, ASICs ("Application Specific Integrated Circuits"), FPGAs ("Field Programmable Gate Arrays"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The following aspects disclose preferred embodiments.

First Aspect

A hydrogen aircraft including:

a gas turbine engine including
- a combustion gas space through which a combustion gas flows and
- a non-combustion gas space adjacent to the combustion gas space in a radial direction of the combustion gas space;

a fuel tank storing hydrogen fuel in a liquid phase;

a fuel supply passage connecting the fuel tank to the gas turbine engine;

at least one heat exchanger interposed in the fuel supply passage and located in the combustion gas space;

at least one heat shield that is movable between a first position and a second position, the first position being a position at which the at least one heat shield projects from the non-combustion gas space to the combustion gas space so as to cover at least a part of an upstream side of the heat exchanger, the second position being a position at which the at least one heat shield is retracted from the combustion gas space to the non-combustion gas space compared to the first position; and an actuator that moves the heat shield between the first position and the second position.

According to this configuration, the actuator is controlled in accordance with the operating state of the gas turbine engine so as to change an area where the heat shield covers the upstream side of the heat exchanger in the combustion gas space. Thus, the change in the amount of heat input to the hydrogen fuel per unit density in the heat exchanger can be reduced. Then, the phase change of the hydrogen fuel in the fuel supply passage of the hydrogen aircraft can be stabilized.

Second Aspect

The hydrogen aircraft according to the first aspect, further including processing circuitry configured to control the actuator in accordance with a parameter that increases as an output of the gas turbine engine increases, wherein the processing circuitry is configured to
- when the parameter changes so as to decrease by a predetermined amount, control the actuator such that the heat shield moves in a direction from the first position toward the second position and
- when the parameter changes so as to increase by a predetermined amount, control the actuator such that the heat shield moves in a direction from the second position toward the first position.

According to this configuration, when the engine operates at high output, and the amount of heat input to the hydrogen fuel per unit density in the heat exchanger tends to increase, the heat transferred from the combustion gas to the heat exchanger can be reduced by the heat shield. On the other hand, when the engine operates at low output, and the amount of heat input to the hydrogen fuel per unit density in the heat exchanger tends to decrease, the extent to which the heat shield blocks the heat transfer from the combustion gas to the heat exchanger can be reduced. Therefore, regardless of the change in the output of the engine, the change in the amount of heat input to the hydrogen fuel per unit density in the heat exchanger can be reduced.

Third Aspect

The hydrogen aircraft according to the first or second aspect, wherein when viewed in a flow direction of the combustion gas space, each of the heat exchanger and the heat shield extends in the radial direction and has a circular-arc shape.

According to this configuration, when the heat shield is located at the second position, the amount of projection of the heat shield in the radial direction in the non-combustion gas space can be reduced.

Fourth Aspect

The hydrogen aircraft according to any one of the first to third aspects, wherein when viewed in a flow direction of the combustion gas space, the heat exchanger and the heat shield are inclined relative to the radial direction.

According to this configuration, when the heat shield is located at the second position, the amount of projection of the heat shield in the radial direction in the non-combustion gas space can be reduced.

Fifth Aspect

The hydrogen aircraft according to any one of the first to fourth aspects, wherein the heat exchanger is located such that a width direction of the heat exchanger extends along a flow direction of the combustion gas space.

According to this configuration, since the area of the heat exchanger is small when viewed from the upstream side of the combustion gas space, the flow resistance of the combustion gas can be reduced.

Sixth Aspect

The hydrogen aircraft according to any one of the first to fifth aspects, wherein:

the heat exchanger includes
- a heat exchange portion located in the combustion gas space and
- a base portion connected to an end portion of the heat exchange portion in the radial direction;

the heat exchange portion includes a projecting portion projecting to an upstream side of the combustion gas space beyond the base portion; and when the heat shield is located at the first position, the heat shield covers at least a part of a portion of the projecting portion which faces an upstream side of a flow direction of the combustion gas space and at least a part of a portion of the projecting portion which faces a direction orthogonal to the flow direction of the combustion gas space.

According to this configuration, when the heat shield is located at the first position, the heat shield can adequately cover the heat exchange portion. Moreover, when the heat shield moves from the first position to the second position, the heat shield can be prevented from interfering with the base portion.

Seventh Aspect

The hydrogen aircraft according to any one of the first to sixth aspects, wherein:

the at least one heat exchanger includes heat exchangers located in the combustion gas space so as to be lined up in a circumferential direction of the gas turbine engine;

the at least one heat shield includes heat shields located so as to correspond to the respective heat exchangers; and among the heat shields, a pair of heat shields adjacent to each other are located at an upstream side and a downstream side in an axial direction of the gas turbine engine.

According to this configuration, even when the heat shields are densely lined up in the circumferential direction of the gas turbine engine, the mutual interference between the heat shields during the movement can be prevented.

The invention claimed is:

1. A hydrogen aircraft comprising:

a gas turbine engine including a combustion gas space through which a combustion gas flows and a non-combustion gas space adjacent to the combustion gas space in a radial direction of the combustion gas space;

a fuel tank storing hydrogen fuel in a liquid phase;

a fuel supply passage connecting the fuel tank to the gas turbine engine;

at least one heat exchanger interposed in the fuel supply passage and located in the combustion gas space;

at least one heat shield that is movable between a first position and a second position, the first position being a position at which the at least one heat shield projects from the non-combustion gas space to the combustion gas space so as to cover at least a part of an upstream side of the heat exchanger, the second position being a position at which the at least one heat shield is retracted from the combustion gas space to the non-combustion gas space compared to the first position; and an actuator that moves the heat shield between the first position and the second position.

2. The hydrogen aircraft according to claim 1, further comprising processing circuitry configured to control the actuator in accordance with a parameter that increases as an output of the gas turbine engine increases, wherein the processing circuitry is configured to when the parameter changes so as to decrease by a predetermined amount, control the actuator such that the heat shield moves in a direction from the first position toward the second position and when the parameter changes so as to increase by a predetermined amount, control the actuator such that the heat shield moves in a direction from the second position toward the first position.

3. The hydrogen aircraft according to claim 1, wherein when viewed in a flow direction of the combustion gas space, each of the heat exchanger and the heat shield extends in the radial direction and has a circular-arc shape.

4. The hydrogen aircraft according to claim 1, wherein when viewed in a flow direction of the combustion gas space, the heat exchanger and the heat shield are inclined relative to the radial direction.

5. The hydrogen aircraft according to claim 1, wherein the heat exchanger is located such that a width direction of the heat exchanger extends along a flow direction of the combustion gas space.

6. The hydrogen aircraft according to claim 1, wherein:

the heat exchanger includes a heat exchange portion located in the combustion gas space and a base portion connected to an end portion of the heat exchange portion in the radial direction;

the heat exchange portion includes a projecting portion projecting to an upstream side of the combustion gas space beyond the base portion; and when the heat shield is located at the first position, the heat shield covers at least a part of a portion of the projecting portion which faces an upstream side of a flow direction of the combustion gas space and at least a part of a portion of the projecting portion which faces a direction orthogonal to the flow direction of the combustion gas space.

7. The hydrogen aircraft according to claim 1, wherein:

the at least one heat exchanger comprises heat exchangers located in the combustion gas space so as to be lined up in a circumferential direction of the gas turbine engine;

the at least one heat shield comprises heat shields located so as to correspond to the respective heat exchangers; and among the heat shields, a pair of heat shields adjacent to each other are located at an upstream side and a downstream side in an axial direction of the gas turbine engine.

* * * * *